United States Patent

[11] 3,597,754

[72] Inventor Julius O. Lerner
  Verona, N.J.
[21] Appl. No. 720,050
[22] Filed Apr. 10, 1968
[45] Patented Aug. 3, 1971
[73] Assignee David Herman
  Livingston, N.J.
  a part interest

[54] APPARATUS FOR DETECTING OBJECT MOVEMENT
  28 Claims, 13 Drawing Figs.
[52] U.S. Cl. .................................................. 340/258 R,
  340/258 B
[51] Int. Cl. ................................................... G08b 13/00
[50] Field of Search ............................................ 340/258

[56] References Cited
  UNITED STATES PATENTS
  3,065,455  11/1962  Roth .............................. 340/258 X
  2,312,127  2/1943   Shepard, Jr. .................. 340/258
  3,046,519  7/1962   Polster ......................... 340/258 UX
  3,471,845  10/1969  Sokoloff ....................... 340/258

Primary Examiner—John W. Caldwell
Assistant Examiner—Michael Slobasky
Attorney—William R. Liberman ABSTRACT: An apparatus for detecting a moving object in a monitored area includes an amplifier, preferably tuned to an ultrasonic frequency and having electromechanical transducers of either resonant or nonresonant type connected to its input and an output and mechanically coupled through the monitored area to form a feedback loop which causes the amplifier to oscillate at its tuned frequency. The amplifier signal level depends upon the state of the monitored area, and any movement therein varies the amplifier signal level as a cosine squared function pulse train. The amplifier output after demodulation is AC coupled to a pulse amplifier, shaper and limited, and then AC coupled to an RC integrating network to produce a DC signal whose level is proportional to the duration of the motionally caused pulse train, and is applied to control a solid state alarm switch. A plurality of pairs of transducers may be connected to each amplifier, and the demodulator and alarm network may be remote from the amplifier and transducers and coupled thereto by radio signals, the electric power line, acoustic coupling through transducers, or by direct wire connection. A plurality of amplifiers of different frequencies may be employed, and corresponding filters may be provided in the demodulating and control networks.

Also, a plurality of amplifiers, each modulating an oscillator, may be employed, and coupled to a common demodulator and control network.

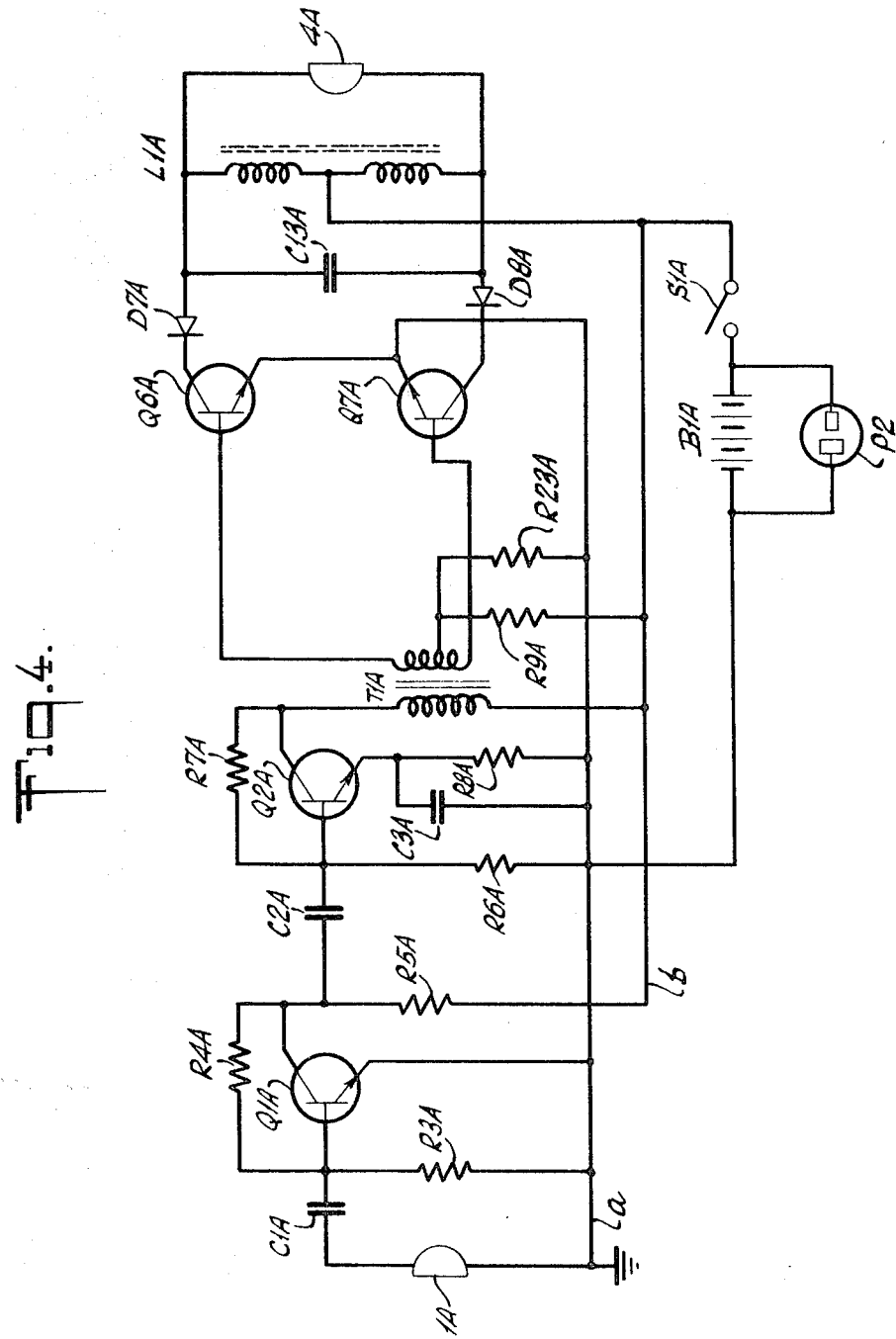

INVENTOR
JULIUS O. LERNER
BY
William R. Liberman
ATTORNEY

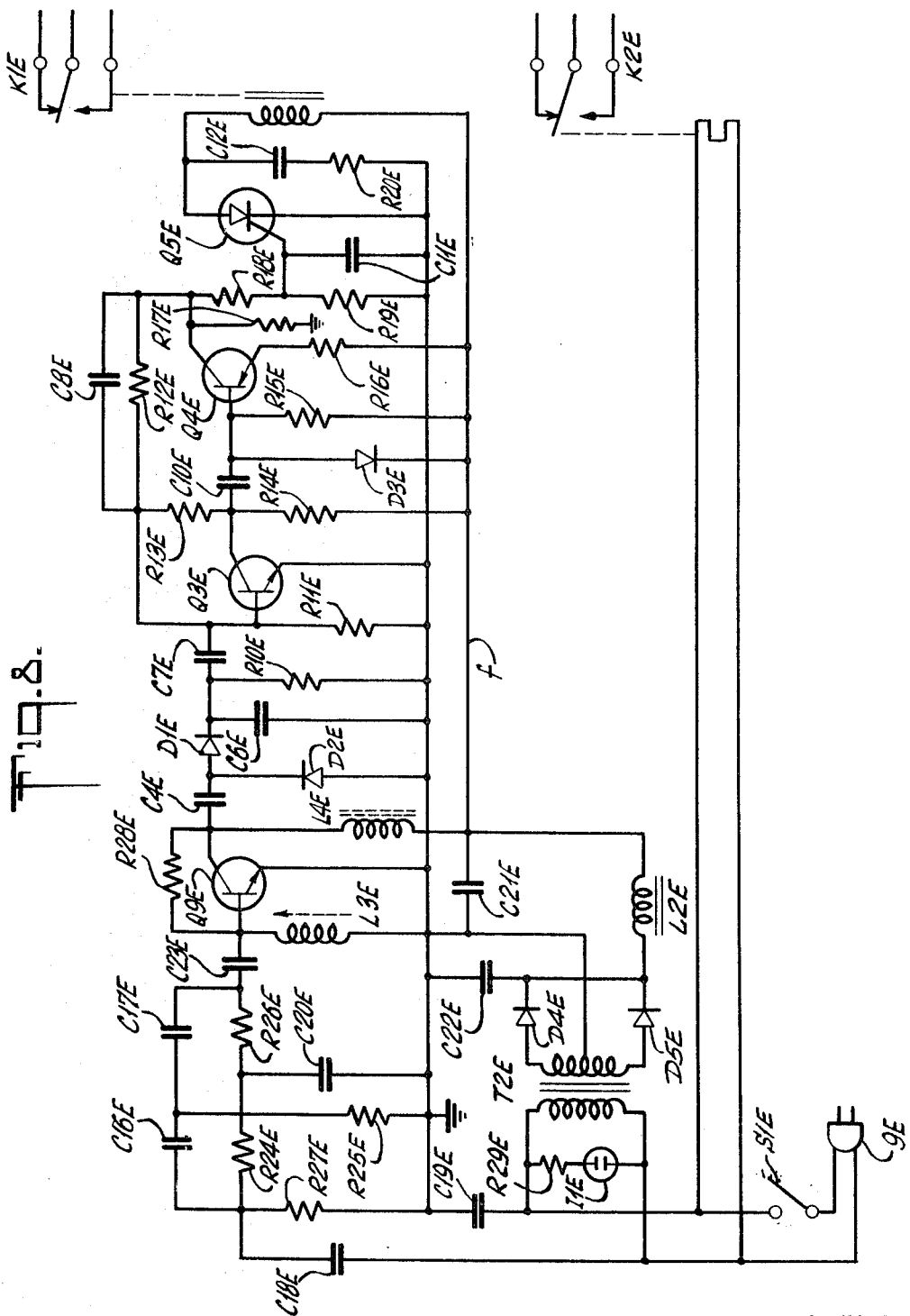

INVENTOR
JULIUS O. LERNER
BY
William R. Liberman
ATTORNEY

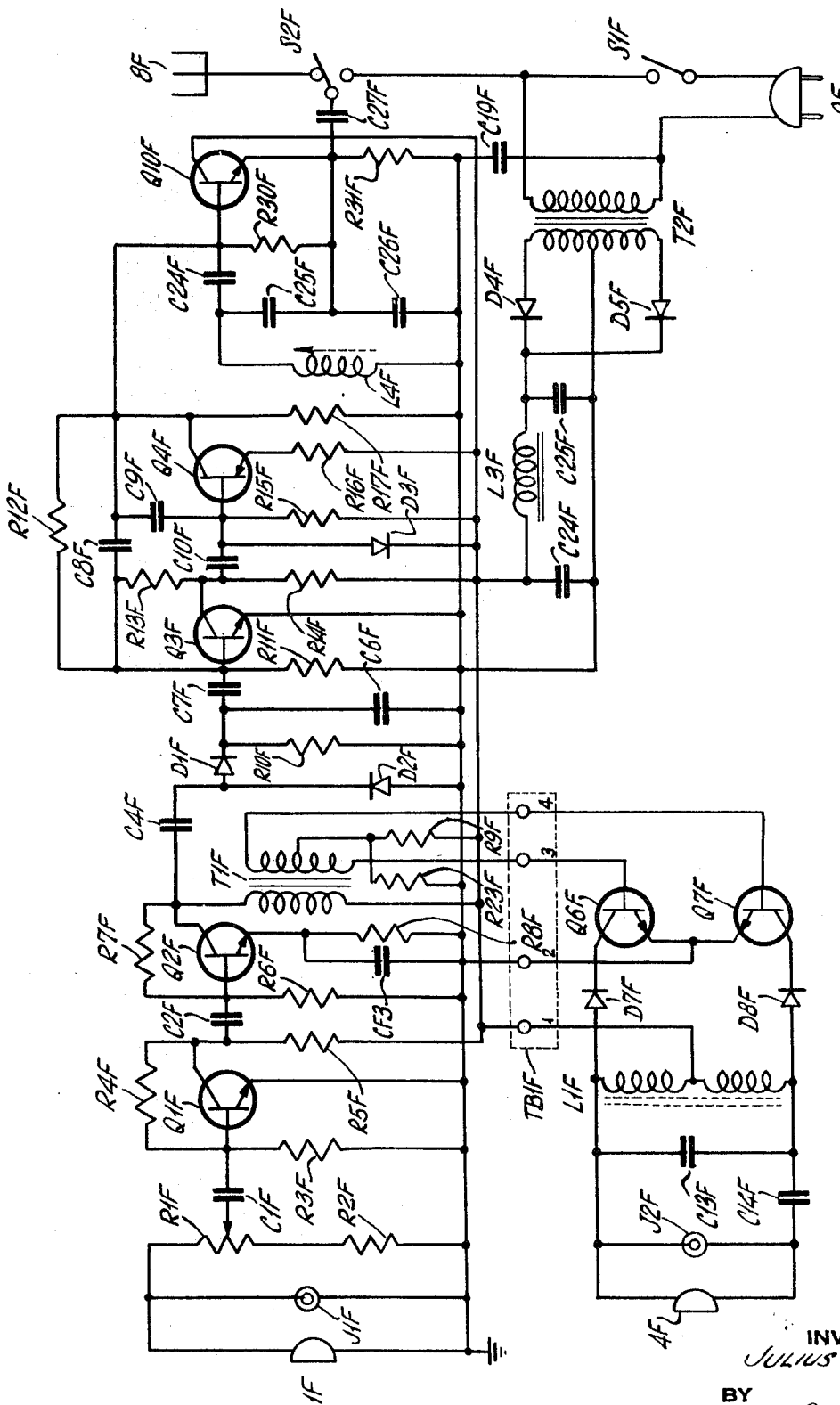

APPARATUS FOR DETECTING OBJECT MOVEMENT

BACKGROUND OF THE INVENTION

The present invention relates generally to improvements in area surveillance apparatus, and relates particularly to an improved apparatus for acoustically detecting the motion of a body in an enclosed area.

Prior ultrasonic intrusion detection devices have employed either the Doppler frequency or phase shift method of deriving a motional indication from acoustic energy reflected from a moving object, or the amplitude variations reflected from an object moving in a standing wave field, or a combination of these methods in an attempt to overcome their low efficiency. The low efficiency of the prior devices has been due to the fact that all of them have utilized an electrical oscillator driving a transducer to produce the necessary acoustic field. Complexity, bulk, and high cost have therefore limited their widespread acceptance and use. Their large size makes inconspicuous installation impossible and makes it necessary to wore the protected premises in an attempt to conceal portions of the equipment. Small self-contained battery-operated detection devices of good coverage and efficiency, and long battery life have not been available. The low efficiency has produced a relatively small initial signal requiring much amplification, and careful, skilled adjustment for such things as phase, objects in the environment, etc. Therefore installation and maintenance have required costly skilled operators.

The exact reason for the inefficiency of the prior detection devices will be herein brought out by a comparison with the present invention.

SUMMARY OF THE INVENTION

It is a principal object of the present invention to provide an improved area surveillance device.

Another object of the present invention is to provide an improved acoustic motion detection apparatus.

Still another object of the present invention is to provide an acoustic motion-detecting apparatus which is simple, compact and highly efficient.

A further object of the present invention is to provide a highly sensitive and stable acoustic motion-detecting apparatus which performs independent of the location of fixed objects in the monitored area, and is substantially insensitive to ambient noise.

Still a further object of the present invention is to provide an acoustic motion-detecting apparatus which is simple to install and may provide sensible signals at remote stations.

Another object of the present invention is to provide a compact, self-powered acoustic motion detection apparatus, operative in the absence or failure of external power source and thereby suitable for portable temporary installation as well as for permanent installation.

Still another object of the present invention is to provide an apparatus of the above nature also characterized by reliability, low cost, versatility, and adaptability.

The above and other objects of this invention will become apparent from a reading of the following description taken in conjunction with the accompanying drawings which illustrate preferred embodiments thereof.

The acoustic motion detection apparatus of the present invention overcomes the main disadvantages of the earlier devices by obviating the need for any discrete and independent electrical or mechanical oscillator.

The motion-detecting system of the present invention employs the ambient environment under surveillance as a mechanical feedback loop around an amplifier which is advantageously tuned to an ultrasonic frequency, whereby the amplifier remains in a state of oscillation as a consequence of the acoustic feedback, and establishes a steady state acoustic field in the protected area, in the absence of any moving object. Any slight change in sound, reflected to the input transducer from an object moving in the field, causes a corresponding amplified change in the signal field produced by the output transducer, which becomes further available at the input transducer via the acoustic feedback path. A regenerative increase in motional signal is thereby created. Unlike earlier acoustic motion detectors, in this invention, field signal not only does not obscure the feeble reflected motional signal of the input transducer, but instead aids it because the field is caused to vary substantially in synchronism with the original signal, thus greatly reinforcing it. The resultant great sensitivity enables battery operation at very low power levels, and makes miniature, low-cost portable motion detection equipment possible.

Since the acoustic field is made responsive to the motional signal and is available at the output of the amplifier as a large modulated signal, a portion may be used as a modulated carrier current without the need for additional circuitry, for transmission of the alarm-producing signal to a remote location.

The modulated signal available in the amplifier has the envelope of a cosine squared pulse train. As was explained in the copending application of Julius O. Lerner, Ser. No. 518,250 now Pat. No. 3,438,020 filed Jan. 3, 1966, this proceeds from the fact that an object moving in a standing wave acoustic field naturally reflects sonic amplitude bursts having the envelope form of a train of cosine squared pulses, expressed as the following function:

$$g(t) = A \cos^2 \pi(t/t_o) \quad \text{(see FIG. 10)}.$$

Thus, with no special additional apparatus, a pulse-modulated carrier is available, which suitably coupled to the electric power line becomes available with means herein to be described, at remote points on the power line, for conversion to an alarm indication, when used with means herein also described.

The apparatus of the present invention comprises an amplifier having an input and an output, together with a first electromechanical transducer connected to said amplifier input, and a second electromechanical transducer connected to said amplifier output and acoustically coupled through the ambient environment to said first electromechanical transducer to provide feedback from said amplifier output in accordance with the state of said ambient environment, whereby to control the signal level of said amplifier, and first means, responsive to variations in said amplifier signal level. The amplifier is tuned advantageously to an ultrasonic frequency, preferably in the low range, by including a tuned filter in the amplifier network, or by use of a resonant second electromechanical transducer. The signal level responsive means consists of a demodulating network which derives its input from the amplifier, and produces an output corresponding to the modulation envelope of the tuned amplifier signal. The demodulated signal is then shaped, amplified, and limited in a regenerative pulse amplifier to a square pulse train and applied to an RC integrating time delay network to produce a switch-triggering signal, only with the production of an adequate integrated signal within a given time interval, thus preventing the triggering of an alarm by noise or transients.

According to a preferred form of the present invention, the amplifier comprises a capacitor coupled preamplifier, transformer coupled to an output amplifier stage, including a push-pull transistor pair, having a parallel resonant capacitor and inductor collector to collector load, tuned to a low ultrasonic frequency. One or more inexpensive crystal or ceramic piezoelectric transducers are connected to the preamplifier input through an adjustable attenuating network, and one or more piezoelectric transducers are connected to the amplifier output, the transducers being suitably positioned in the monitored area and acoustically coupled therethrough. The demodulating network consists of an input coupling capacitor, rectifier pair, shunt filter and storage capacitor and shunt leakage resistor, having its input connected to the preamplifier output and its output connected to the input of a regenerative, saturation-type capacitor-coupled pulse amplifier, having a squared and amplitude limited pulse output, which is directly connected to an RC-integrating network, having its output connected to the gate electrode of a silicon controlled rectifier, which in turn controls the energization of an alarm relay. This entire device may be a self-contained unit or for some application it is advantageous for the sensing amplifier and transducers to be remotely located from the rest of the network and suitably coupled thereto.

For example, the input to the demodulator may be the output of a second amplifier whose input is a piezoelectric transducer exposed in the monitored area to the output of the transducer which is driven by the sensing amplifier. Alternately, the demodulator input may be coupled to the sensing amplifier output through the power lines by modulated carrier current, or by radio wave signal transmitted and received with antennas and means to be herein described.

BRIEF DESCRIPTION OF THE DRAWINGS

FIG. 3 is a block diagram of a second embodiment of the present invention wherein the sensing and detecting sections are remotely separated units, acoustically coupled;

FIG. 4 is a schematic circuit diagram of the motion-sensing section thereof;

FIG. 8 is a schematic circuit diagram of the detecting and control unit thereof;

FIG. 9 is a block diagram of the sensing section of a fourth embodiment of the present invention wherein the sensing and detection sections are remotely separated units, coupled by radio wave signals, or alternately by radio frequency carrier current through the power lines;

FIG. 12 is a schematic circuit diagram of the sensing section, FIG. 9;

DESCRIPTION OF THE PREFERRED EMBODIMENTS

Figure 1:
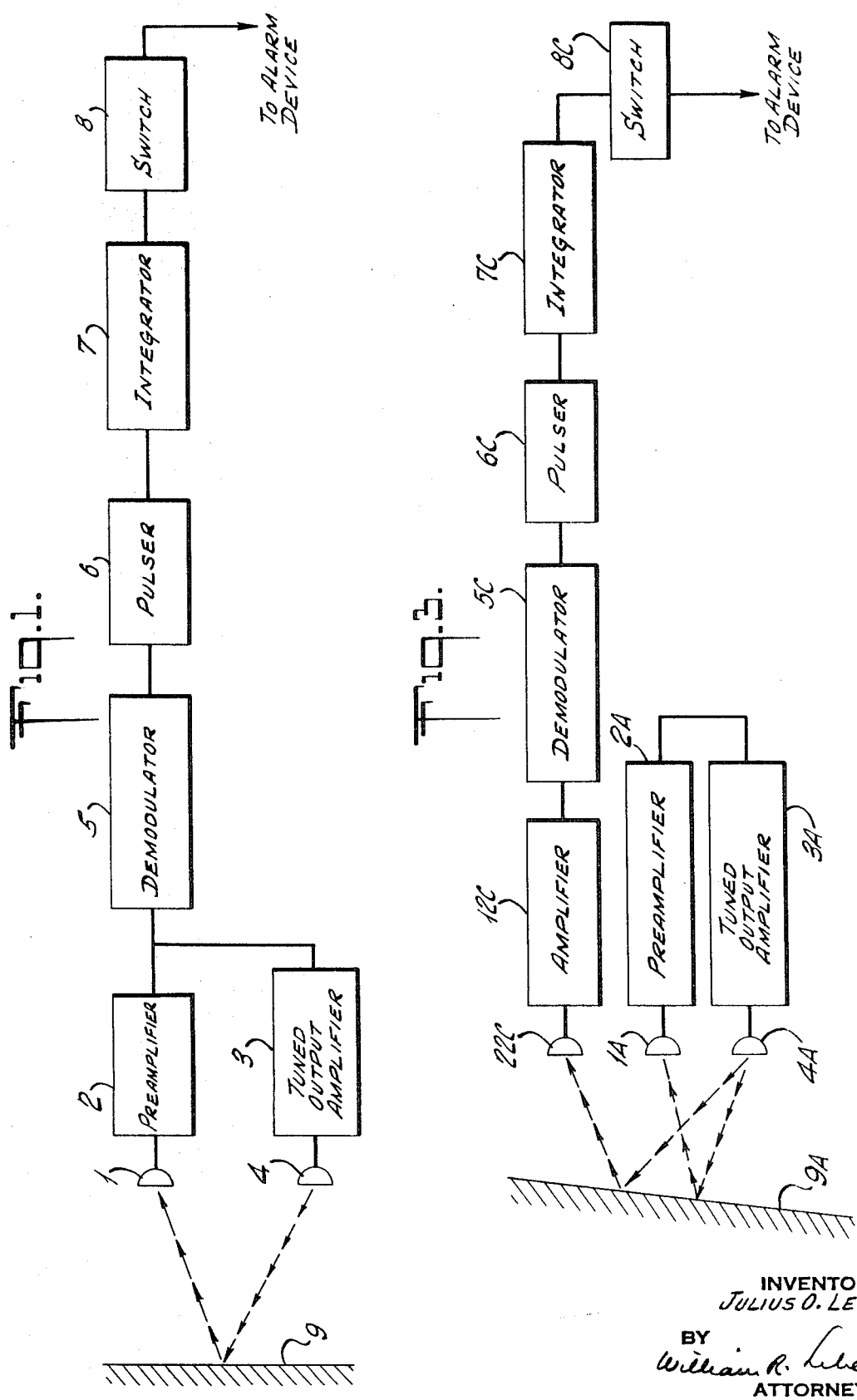
FIG. 1 is a block diagram of a preferred embodiment of the present invention in the form of a self-contained unit.
Figure 2:
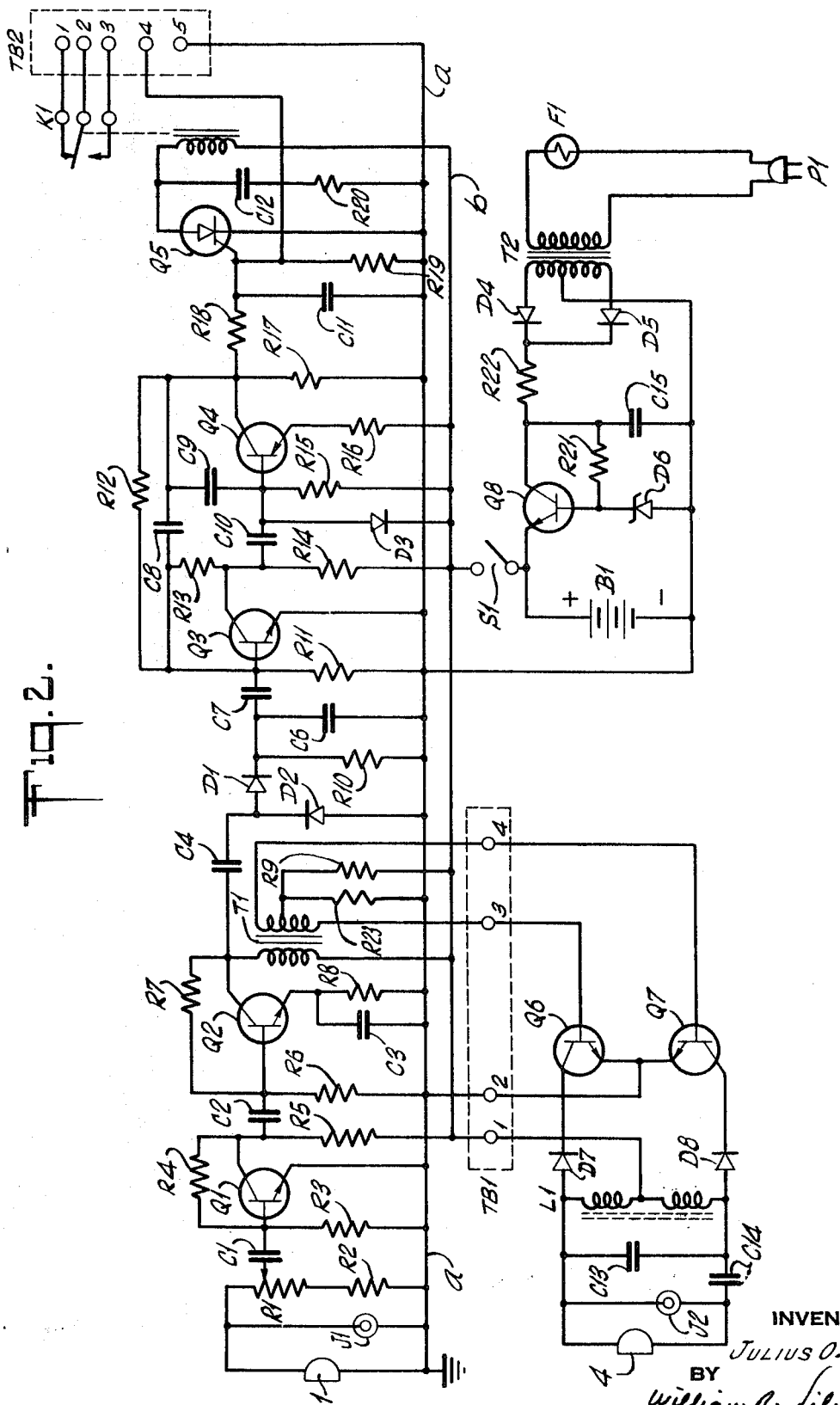
FIG. 2 is a schematic diagram of the embodiment of FIG. 1.

Referring now to the drawings, and particularly FIGS. 1 and 2 thereof which illustrate a preferred embodiment of the present invention constructed as a single unit, the improved apparatus comprises a tuned amplifier including a preamplifier 2 having its output connected to an output amplifier 3. A first electromechanical transducer 1, which may be an inexpensive piezoelectric element, is connected to the input of preamplifier 2 and a second electromechanical transducer 4, which may also be an inexpensive piezoelectric element, is connected to the output of the amplifier section 3. Transducers 1 and 4 are exposed to the monitored area which may contain one or more interfaces as typified by a wall 9 whereby acoustical energy emitted by transducer 4 is reflected to transducer 1 to establish a feedback loop between the output of amplifier 3 and the input of preamplifier 2. In the absence of any changes in the ambient area, amplifiers 2 and 3 including the feedback established by transducers 1 and 4 through the monitored area produce a signal at the tuned frequency of the amplifier, which may be determined by the use of a tune filter in the amplifier network, the signal being at a substantially constant or steady state level. However, in the presence of a moving object the signal level varies in a manner and at a frequency as described above, which is a function of the rate of movement of the object and other parameters.

The output of preamplifier 2 is AC coupled to the input of a demodulator and voltage doubler network 5 whose output is the modulation envelope of the tuned amplifier signal, being zero in the absence of a moving object, and in the presence of a moving object is a signal varying as has been set forth above. The demodulated signal from network 5 is fed to the input of pulse amplifying, squaring and limiting network 6 whose output in the presence of a moving object is a square pulse train of uniform amplitude, with repetition rate depending on moving object velocity. The pulses from network 6 are connected to an integrating, timing network 7, which produces a DC output which is a function of pulse duration and continuity. The output of a integrating network 7 is applied to the control terminal of a solid state switch which energizes a relay to control a sensible signal. S Substantially, the apparatus of this invention does not respond to noise or transients, but only to moving objects.

In order to be independent of any external power failures, the apparatus is energized by a rechargeable battery B1, having its negative terminal connected to a ground line $a$ and its positive terminal connected through a switch S1 to a voltage line $b$. Battery B1 is maintained at full charge by a regulated charging network including a stepdown transformer T2 whose primary is connected through fuse F1 and by means of a plug P1 to the AC power line, and whose secondary terminals are connected to the respective anodes of a pair of full-wave rectifier diodes, D4 and D5. The cathodes of diodes D4 and D5 are connected through a current-limiting resistor R22 to the collector of a transistor Q8 whose emitter is connected to the positive terminal of battery B1 and whose base is connected through a reference diode D6 to the center tap of the secondary of transformer T2. The collector of transistor Q8 is connected through a capacitor C15 to the transformer center tap and through a resistor R21 to the transistor base. Since the charger network voltage is constant, charging current drops to substantially zero when battery B1 is fully charged.

Preamplifier 2 includes a pair of capacitor-coupled transistors Q1 and Q2, the base of transistor Q2 being connected through a coupling capacitor C1 to the arm of a potentiometer R1. The resistance element of potentiometer R1 is connected in series with a resistor R2 across transducer 1 and across the terminals of a jack J1 which permits the connection of additional transducers in parallel with transducer 1. An end of transducer 1 and resistor R2 are grounded to line $a$. A resistor R3 connected between the base and emitter of transistor Q1 and a resistor R4 connected between the base and collector, function as a bias divider and feedback network for transistor Q1, the emitter of which is grounded and the collector of which is connected through a load resistor R5 to line $b$ and through a coupling capacitor C2 to the base of transistor Q2.

A resistor R6 connected between the base of transistor Q2 and ground and a resistor R7 connected between the base and collector, junction as a bias divider and feedback network for transistor Q2. The emitter of transistor Q2 is grounded through a stabilizing resistor R8 which is shunted by a signal bypass capacitor C3, and the collector of transistor Q2 is connected to line $b$ through the primary of a coupling transformer T1 having a secondary center tap connected to ground through resistor R23.

Push-pull amplifier 3, tuned to a low ultrasonic frequency, includes transistors Q6 and Q7, having their emitters grounded through a terminal board TB1. The collector of transistor Q6 is connected to one terminal of transducer 4 through diode D7, and the collector of transistor Q7 is connected through DC blocking capacitor C14 and diode D8 to the other terminal of transducer 4, across which transducer jack J2 is connected to permit adding additional transducers in parallel with transducer 4. A parallel tuned filter network consisting of capacitor C13 and center-tapped inductance L1, resonant at a low ultrasonic frequency, is connected across transducer 4, the inductor center tap being connected through terminal board TB1 to line b. The bases of transistors Q6 and Q7 are corrected through terminal board TB1 to respective terminals of the secondary of transformer T1, and the center tap of the secondary of T1 is connected by a resistor R9 to line b. Diodes D7 and D8, mentioned above, have the function of blocking forward biasing of the collector base junctions of transistors Q6 and Q7 during large negative collector signal voltage excursions, possible by reason of the tremendous variation in driving signal at the bases of transistors Q6 and Q7.

The demodulator network 5 is coupled to the collector of transistor Q2 through capacitor C4 and includes a diode D1 with its anode connected to capacitor C4 and its cathode connected through a capacitor C6 to ground and a diode D2 with its cathode connected to capacitor C4 and its anode grounded. Capacitor C6 is shunted by a leakage resistor R10 so that the voltage across the capacitor C6 corresponds to the changing level or low frequency modulation envelope of the tune frequency signal in amplifiers 2 and 3.

The pulse-shaping amplifier 6 comprises a pair of opposite type transistors Q3 and Q4 which are coupled as a regenerative pulse amplifier and performs pulse-squaring and saturation-limiting functions. The base of transistor Q3 is connected by high capacity coupling capacitor C7 to the ungrounded terminal of capacitor C6 and is connected by a resistor R11 to ground. The emitter of transistor Q3 is grounded and the collector is connected through a load resistor R14, to line b and through a resistor R13 to to the base of transistor Q3, resistor R13 functioning with resistor R11 as a bias divider and negative feedback loop for transistor Q3.

The base of transistor Q4 is connected by a coupling capacitor C10 to the collector of transistor Q3 and to line b through a resistor R15 which serves as a base emitter low impedance return to minimize forward bias on transistor Q4 due to temperature dependent collector-base leakage current. The emitter of transistor Q4 is connected to line b by an emitter stabilization resistor R16 and the collector is grounded through a load resistor R17. The regenerative feedback network includes a parallel connected resistor R12 and capacitor C8 connected between the collector of transistor Q4 and the base of transistor Q3, and a capacitor C9 connected between the base and collector of transistor Q4. A diode D3 is connected between line b and the base of transistor Q4 to prevent the base from going positive.

The pulse output of network 6 as derived from the collector of transistor Q4 is summed by the time delay integrating network 7 which includes a capacitor C11 having one terminal grounded and being shunted by resistor R19, and a resistor R18 connecting the other terminal of capacitor C11 to the collector of transistor Q4. Thus, the voltage established across capacitor C11 is a function of the voltage across load resistor R17 and the duration thereof as related to the discharge of capacitor C11 through the resistors connected across capacitor C11 which in turn depends on the time duration of the square pulse train.

The alarm control network 8 includes a solid state switch such as a silicon-controlled rectifier Q5 whose gate electrode is connected to the ungrounded terminal of capacitor C11, resistor R19 functioning to lower the gate to cathode impedance of controlled rectifier Q5 to minimize temperature dependent turn-on bias due to leakage. The solenoid of a relay K1 is connected between the anode of controlled rectifier Q5 and line b and the anode of controlled rectifier Q5 is connected through the series-connected capacitor C12 and resistor R20 to ground and the cathode is connected to ground, capacitor C12 and resistor R20 preventing premature turn-on of the controlled rectifier Q5 due to rate effect. The relay K1 includes contacts which may be used to open or close an energy source to any type of alarm, recorder, camera, or other device. Terminal board TB2 includes terminals connected to the contacts of relay K1, as well as terminals 4 and 5 which are connected across capacitor C11, and used to disable trigger voltage buildup from a remote point, by connecting a remote switch across the two terminals.

In employing the improved apparatus described above, transducers 1 and 4 as well as additional transducers if required, connected to jacks J1 and J2, are distributed throughout the area under surveillance. The apparatus is activated by first closing the remote switch connected across terminals 4 and 5 of terminal board TB2, thereby preventing actuation of the alarm when energy is turned on by closing switch S1; then returning to the remote switch which is outside the protected area and turning that key operated switch to the open position, and removing the key. Any ambient noise; ever present, picked up by transducer 1, becomes amplified, and that portion which is at tuned amplifier frequency is applied to transducer 4 and fed back through the ambient environment and by reflection to establish an acoustic feedback loop to transducer 1, wherein the sensing amplifier network, including transducers 1 and 4 and amplifiers 2 and 3, reach a steady state signal at the tuned frequency. During the steady state of the sensing amplifier a constant voltage is produced across capacitor C6, and therefore no signal is transmitted through capacitor C7, and hence no signal is applied to the pulse amplifier and integrating network, and the controlled rectifier Q5 remains nonconducting.

In the presence of a moving object in the monitored area, the steady state of the sensing amplifier is disturbed and a periodically varying signal level is established therein, as has been explained above. The part of the signal derived through capacitor C4 being demodulated and applied through capacitor C7 to the regenerative pulse amplifier 6, from demodulator 5. The pulse output from pulse amplifier 6 is integrated in RC integrator network R18 and C11 and applied to the gate of controlled rectifier Q5, which conducts when the voltage across capacitor C11 reaches the firing voltage of controlled rectifier Q5. Random impulses are insufficient to fire the controlled rectifier and shortly leak off of capacitor C11.

Figure 5:
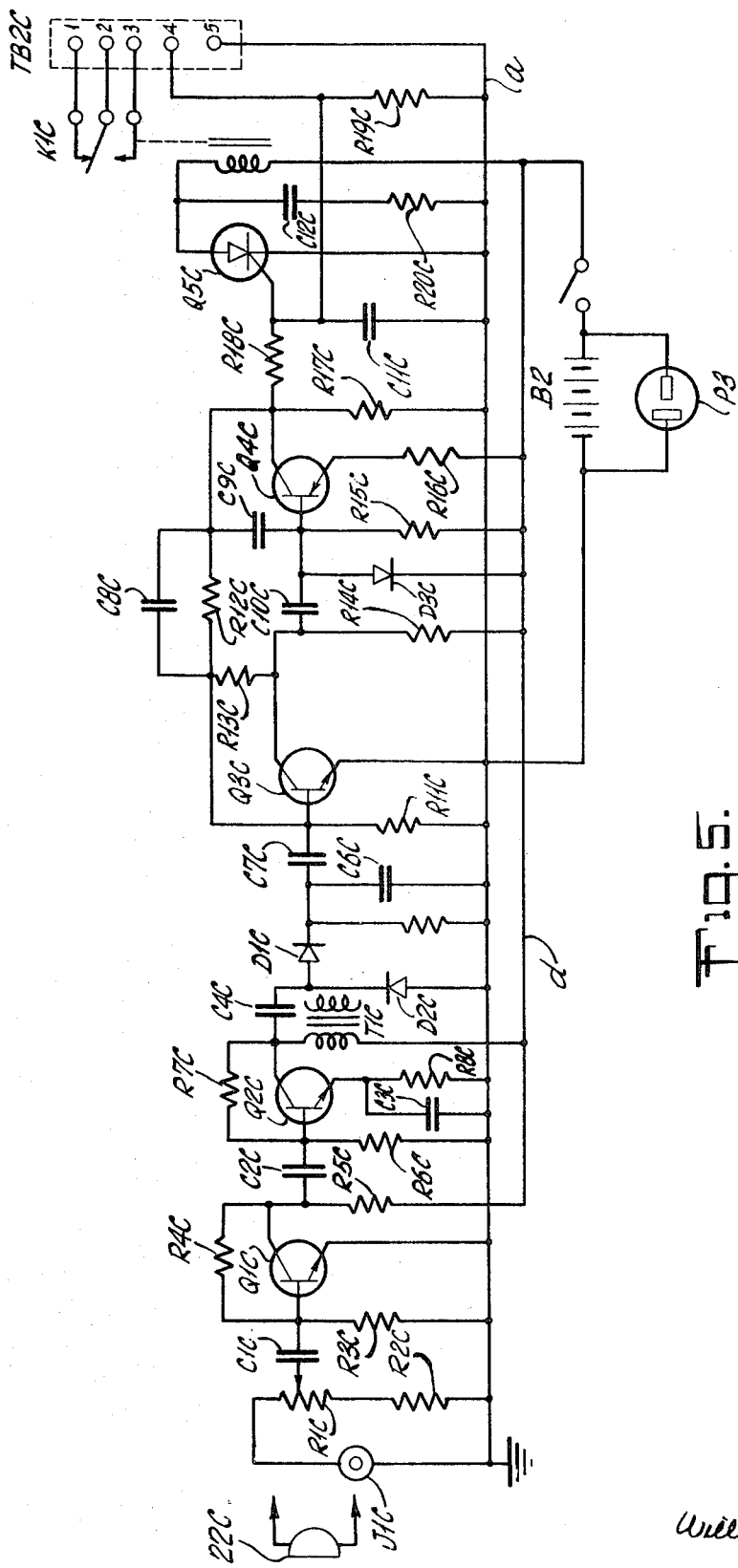
FIG. 5 is a schematic circuit diagram of the detecting and control sections thereof.

The apparatus illustrated in FIGS. 3, 4 and 5 of the drawings differ from that described above primarily in that the sensing amplifier and its transducers is a separate unit from the detecting and control unit, and the units are acoustically coupled through the monitored area. Specifically, the apparatus includes input and output transducers 1A and 4A and associated preamplifier 2A and output amplifier 3A, all being constructed and related in the manner of transducers 1 and 4, and amplifiers 2 and 3 to constitute the sensing unit, and a separate detecting and control unit including an electromechanical transducer 22C acoustically coupled to transducer 4A through the monitored area, for example, as reflected from an interface 9A. Transducer 22C is connected to the input of an amplifier 12C, whose output is connected to and through a demodulating network 5C to a regenerative pulse amplifier 6C, whose output is integrated by a time delay integrating network 7c, the output of which, in turn, triggers a solid-state alarm control switch 8C. Networks 5C, 6C, 7C, and 8C are functionally similar to and related in the manner of the previously described networks 5, 6, 7, and 8, respectively.

Preamplifier 2A includes two capacitor coupled amplifier stages using transistors Q1A and Q2A, and having associated networks and intercoupled in the manner of the transistors Q1 and Q2 with their networks. Transducer 1A has one terminal grounded and its other terminal connected through a capacitor C1A to the base of transistors Q1A. Amplifier 3A includes a pair of transistors Q6A and Q7A arranged in a push-pull circuit and provided with a filter network tuned to a low ultrasonic frequency, in the manner of the amplifier of 3. The bases of transistors Q6A and Q7A are connected to the opposite terminals of the secondary of a coupling transformer T1A, having its center tap connected to ground through resistor R23A, and connected to the ungrounded voltage line through a resistor R9A. The primary of transformer T1A is connected between the collector of transistor Q2A and the ungrounded voltage line. A powering battery B1A is connected between ground and the ungrounded voltage line through a switch S1A, and the battery is shunted by a polarized plug P2, to facilitate charging the battery.

The amplifier 12C is of similar circuit to the preamplifier 2 described above, and includes two capacitor-coupled transistor amplifier stages using transistors Q1C and Q2C. The transducer 22C is coupled to a jack J1C, across which are series connected the resistance element of potentiometer R1C and resistor R2C, the potentiometer arm being connected through a capacitor C1C to the base of transistor Q1C. Except that the secondary of transformer T1C is not utilized, the circuit of amplifier 12C is the same as that of amplifier 2. Also, the demodulating network 5C is the same as demodulating network 5. Pulsing network 6C functions in the manner of pulsing network 6, and includes NPN transistor Q3C and a PNP transistor Q4C. The base of transistor Q3C is coupled through a capacitor C7C to the output of the demodulator network 5C and to ground through a resistor R11C, and the emitter is connected to ground. The collector of transistor Q3C is connected by a resistor R13C to the base of transistor Q3C, and through a resistor R14C to the ungrounded battery line d, and through a capacitor C10C to the base of transistor Q4C. The base of transistor Q4C is connected to line d through a diode D3C in parallel with a resistor R15C, and the emitter is connected to line d through resistor R16C, and the collector is grounded through load resistor R17C. The regenerative feedback network includes a capacitor C8C and a resistor R12C connected in parallel between the collector of transistor Q4C and the base of transistor Q3C, and a capacitor C9C connected between the base and collector of transistor Q4C. Integrating network 7C and switch network 8C, and the alarm system are similar to the integrating network 7 and switch network 8 and alarm system respectively of the first described embodiment. In the circuit diagrams of FIGS. 4 and 5, except as described above, the various other components and elements designated with the postscript letters A and C correspond to the elements and components identified in FIG. 2 without such postscripts. The operation of the apparatus last described is similar to that first described, except that the sensing amplifier and its transducers is remotely spaced from the detection and control section and is acoustically coupled thereto by means of a plug-in transducer 22C, plugged into jack J1C and exposed to the monitored area.

Figure 6:
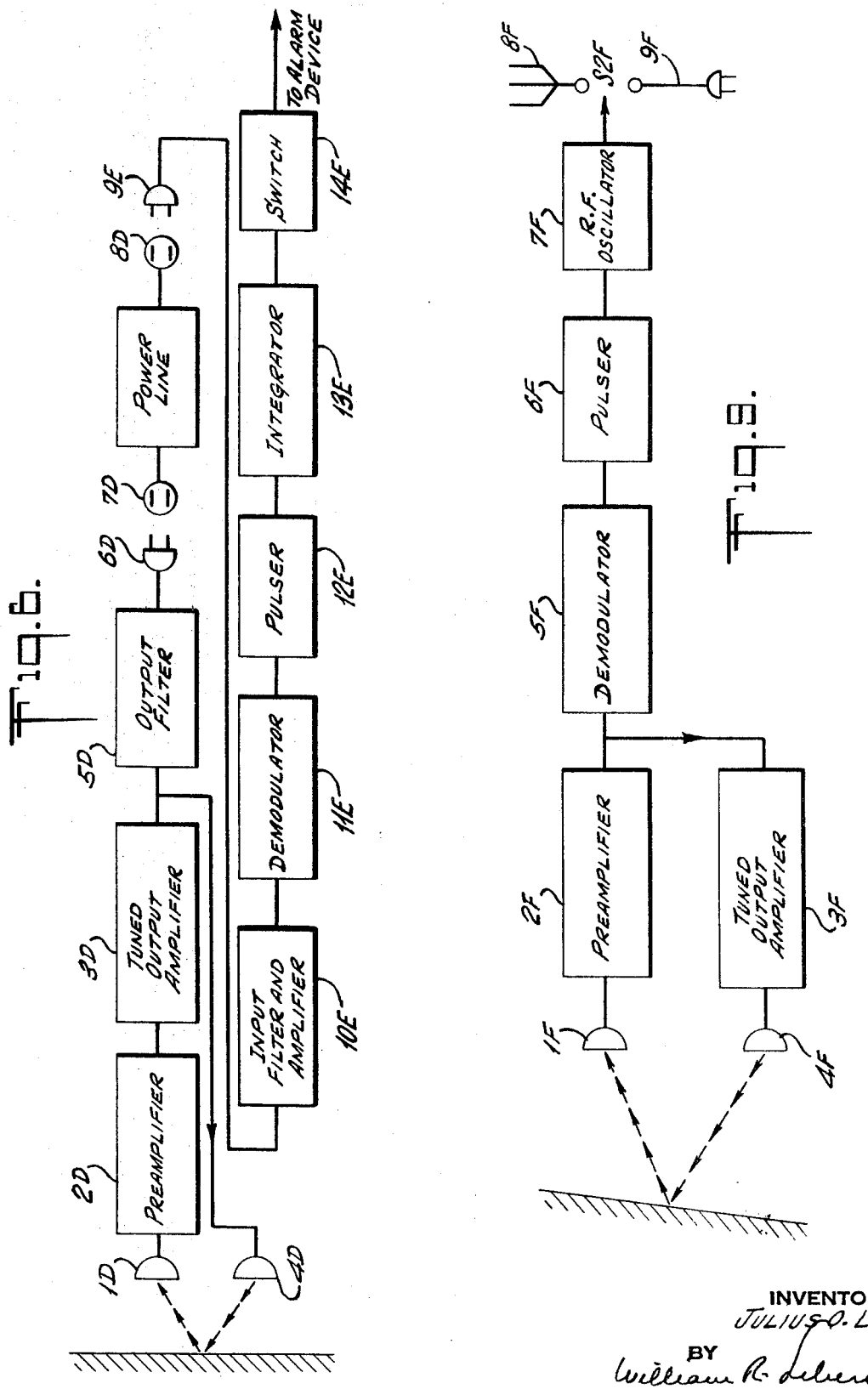
FIG. 6 is a block diagram of a third embodiment of the present invention, wherein the sensing and detection sections are remotely separated units, coupled through the power lines, using a portion of the sensing amplifier output as a carrier current.
Figure 7:
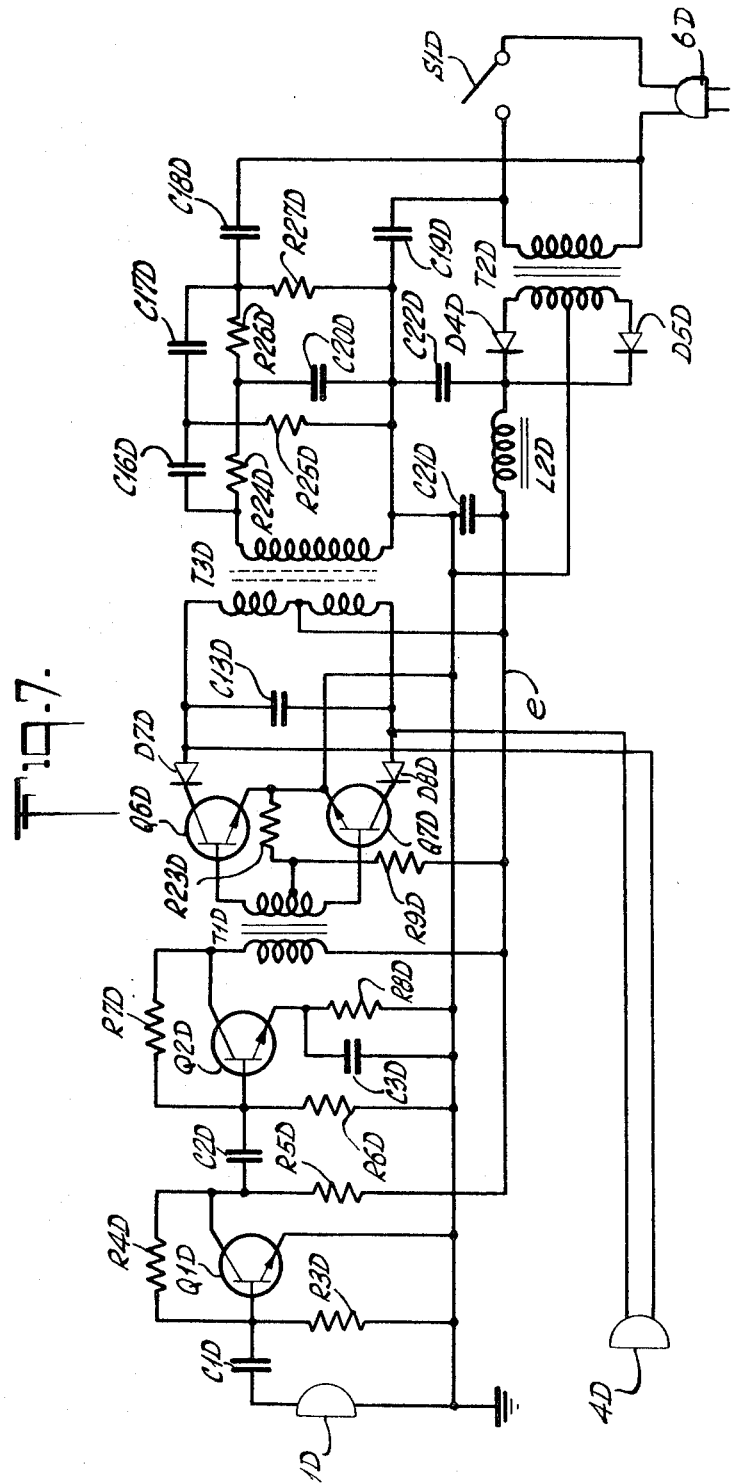
FIG. 7 is a schematic circuit diagram of the sensing unit thereof.

The embodiment of the present invention illustrated in FIG. 6, 7, and 8 of the drawings, differs from that last described in that the sensing section is coupled to the detection and control section through the commercial electrical power line, instead of acoustically, in order to make for a simplified installation. Specifically, the apparatus comprises a sensing section including a first transducer 1D exposed to the monitored area and coupled to the input of a preamplifier 2D, which drives a tuned amplifier 3D whose output is connected to a second transducer 4D, likewise exposed to the monitored area, in order to establish a feedback loop necessary for sensing. A portion of the output of amplifier 3D is coupled through a filter network 5D to the electric power line by means of a conventional power plug and receptacle 6D and 7D respectively. The detecting section includes a filter and a tuned amplifier network 10E, whose input is connected to the electric power line through a conventional power plug and receptacle 9E and 8D respectively, and whose output is connected to demodulator 11E. The output of demodulator 11E is connected to the input of pulse amplifier 12E, and the output of pulse amplifier 12E is connected to integrator 13E. The output of integrator 13E is connected to the gate of switching network 14E, all of which are similar to and corresponding to networks 5, 6, 7, and 8 previously described.

The first transducer 1D and preamplifier 2D of similar construction and relationship as the previously described transducer 1 and preamplifier 2.

Amplifier 3D and transducer 4D are of similar construction to amplifier 3 and transducer 4 previously described, with the exception that transformer T3D is substituted for inductor L1. The primary of transformer T3D is identical to and connected in the same manner in tuned amplifier 3D as inductor L1 is in tuned amplifier 3. The secondary of transformer T3D is coupled to the electric power line plug 6D through a parallel T network filter, tuned to reject the power line frequency and pass-sensing amplifier frequency. The parallel T filter includes series connected resistors R24D and R26D and capacitor C18D, from one terminal of the secondary of transformer T3D to one terminal of plug 6D, and the second terminal of the secondary of transformer T3D is grounded, and also connected through capacitor C19D and switch S1D to the other terminal of plug 6D.

The junction of resistors R24D and R26D is grounded through capacitor C20D, while the junction of capacitors C16D and C17D which are series connected between the remote ends of resistors R24D and R26D, is grounded through resistor R25D. A resistor R27D is connected between the terminals of capacitors C18D and C19D which are remote from the plug 6D. The sensing unit is energized by a conventional power supply, including a transformer T2D, with primary connected through switch S1D to the terminals of plug 6D, and with the secondary output rectified by diodes D4D and D5D, and filtered by a filter network made up of capacitors C21D, C22D, and inductor L2D. Said filtered voltage is connected across line e and ground.

The input coupling filter and tuned amplifier network 10E employs a filter similar to filter network 5D and includes a tuned transistor Q9E amplifier whose emitter is grounded and whose collector is connected to line f through an inductor L4E and to the transistor base through a resistor R28E. The base of transistor Q9E is grounded through a variable inductor L3E and is connected through successive series connected capacitor C23E, resistors R26E and R24E, and capacitors C18E to one terminal of plug 9E. The other terminal of plug 9E is grounded through capacitor C19E. A neon indicator lamp 11E in series with resistor R29E is connected across transformer T2E primary. Capacitors C16E and C17E in series are connected between the remote points of resistors R24E and R26E, and the junction of capacitors C16E and C17E is grounded through a resistor R25E, the junction of the resistors R24E and R26E being grounded through a capacitor C20E. The amplifier with Q9E is tuned to the frequency of amplifier 3D, so as to permit the passage of the tuned frequency from the plug 9D to the amplifier incorporating transistor Q9E, while the parallel T-filter attenuates power line frequency.

The demodulator 11E, pulse amplifier 12E, integrator 13E, and switching network 14E are the same as the corresponding respective networks of 5, 6, 7, and 8 previously described; demodulator 11E, including diodes D1E and D2E, and pulse amplifier 12E, including transistors Q3E and Q4E; while the integrating network 13E includes resistors R18E and capacitor C11E, and the switch network 14E includes silicon controlled rectifier Q5E, and each their associated networks. Controlled rectifier Q5E controls an alarm relay K1E, similar to the previous embodiments.

The detecting section, shown in FIG. 8 schematic circuit diagram, is energized by a conventional power supply, including a transformer T2E, with primary connected through switch S1E to the terminals of plug 9E, and with secondary output rectified by diodes D4E and D5E, and then filtered by a filter network make up of capacitors C21E and C22E, together with inductor L2E. Said filtered voltage is connected across line f and ground.

The solenoid of delay relay K2E is connected across the primary of transformer T2E, and the contacts of relay K2E provide an alarm indicating power failure if line power is interrupted for more than 5 minutes. In the circuit diagrams of FIGS. 7 and 8, and except as described above, the various other components and elements designated with the postscript letters D and E correspond to the components and elements of the earlier described components and designated without postscript letter D and E or with other postscript letters.

Figure 11:
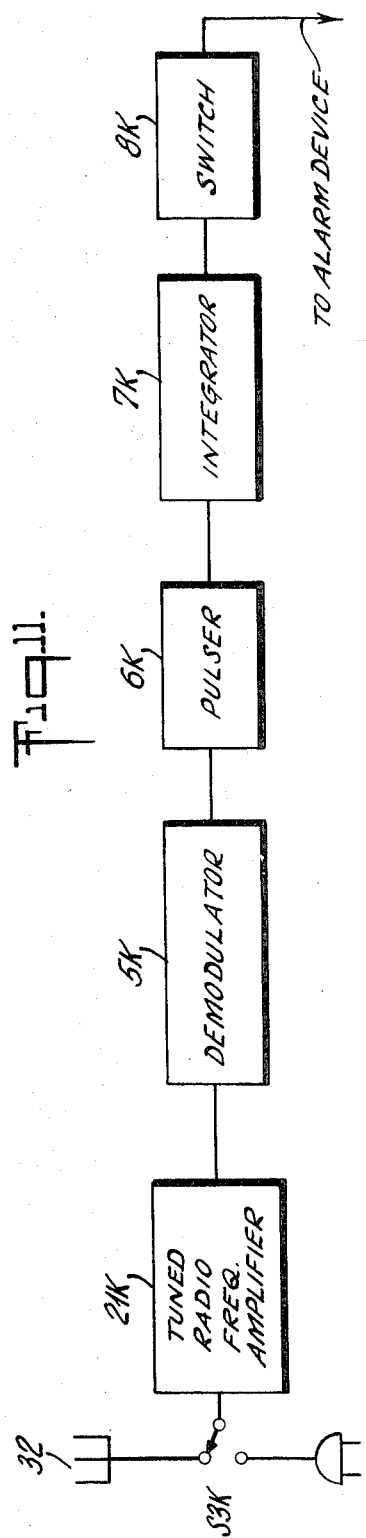
FIG. 11 is a block diagram of the detection and control section used with the sensing section, FIG. 9.
Figure 10:
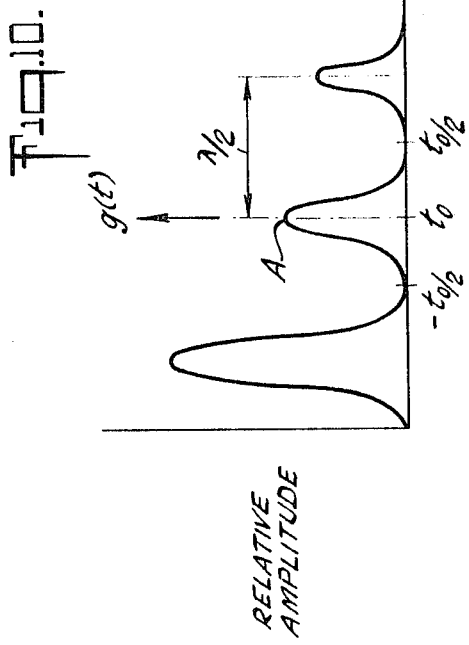
FIG. 10 is a diagram of the amplitude function with time, of sonic energy reflected from a body moving in a standing wave field.
Figure 13:
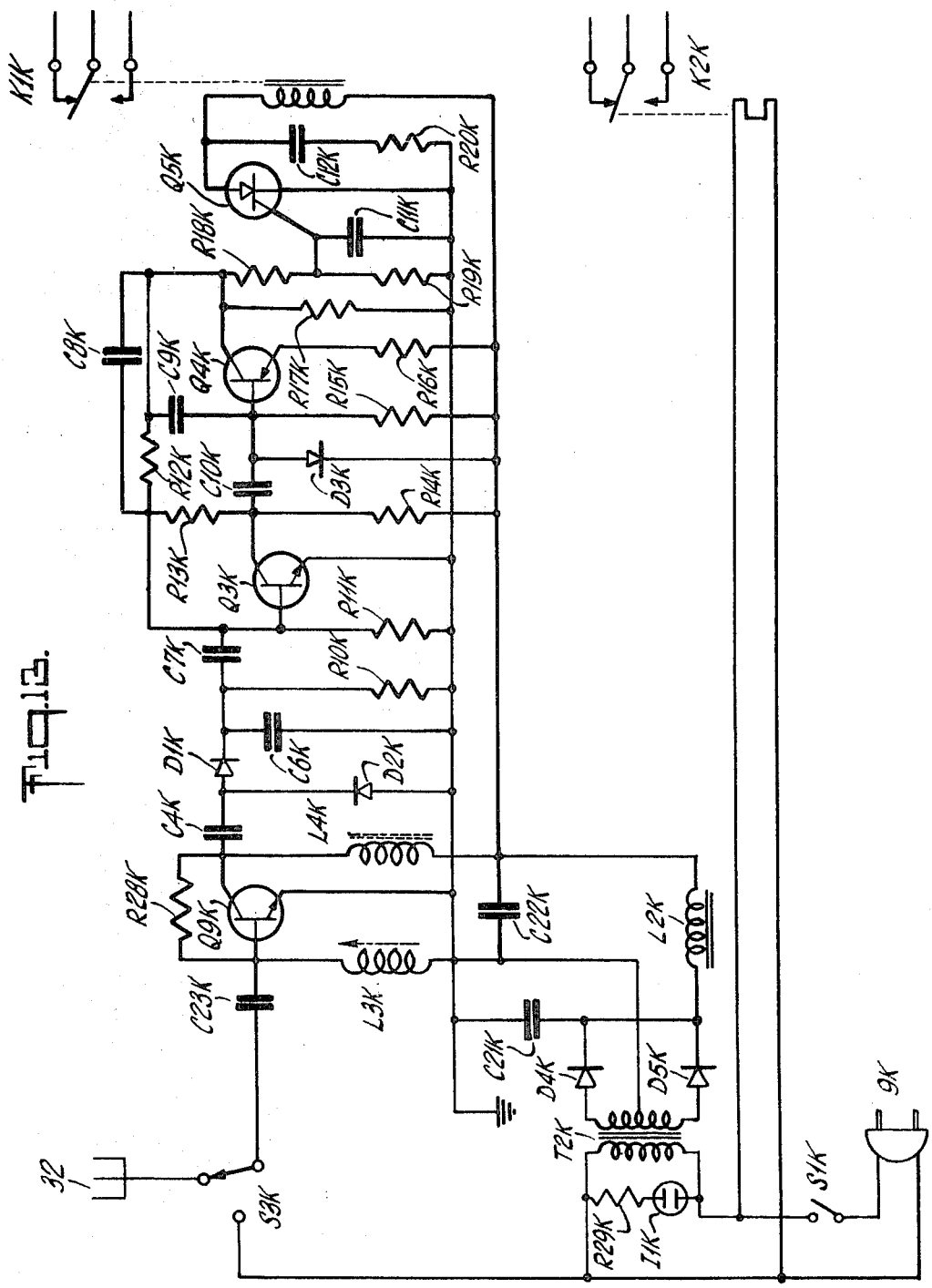
FIG. 13 is a schematic circuit diagram of the detecting section, FIG. 11.

Referring now to block diagram FIGS. 9 and 11, and related schematic circuit diagrams FIGS. 12 and 13: In this embodiment of the present invention, instead of transmitting the signal from the sensing amplifier to a remote control station at the sensing amplifier frequency, there is utility in demodulating the sensing amplifier signal and using the amplified pulse to modulate a radio-frequency-transmitting oscillator, and the modulated radio frequency transmitted either through the power line or by antenna to the control network, where the radio frequency signal is demodulated, amplified, integrated and used to control the alarm-switching network. Thus, as depicted in FIG. 9 of the drawings, the network includes a first transducer 1F connected to a preamplifier 2F, which is connected through a tuned amplifier 3F to a second transducer 4F which with first transducer 1F is exposed to the monitored area. The output of preamplifier 2F is connected through a demodulator 5F to a pulse amplifier 6F. Transducers 1F and 4F, amplifiers 2F and 3F and demodulator 5F, and pulse amplifier 6F each corresponds to and are related in the manner of transducers 1 and 4 and networks 2, 3, 5, and 6 previously described. The output of pulse amplifier 6F modulates an RF transmitting oscillator 7F of conventional construction, and the modulated radio frequency output of oscillator 7F is either connected to a radiating antenna 8F or coupled to power line plug 9F through coupling capacitor C27F. The remote detector and control network, shown in the block diagram of FIG. 11, and schematic circuit diagram of FIG. 13, picks up the modulated radio frequency signal, either by means of an antenna 32, or as a carrier current from the power line, depending on the setting of switch S2F in the sensing section and switch S3K in the detection section of the apparatus, and demodulates in demodulator 5K, the radio signal from antenna 32, which has been previously selected and amplified in tuned radio frequency amplifier 21K. The output of demodulator 5K is connected to the input of pulse amplifier 6K, and the output of pulse amplifier 6K is connected to the input of integrator 7K, while the output of integrator 7K is applied to the gate input of switching network 8K, to control an alarm device. Tuned amplifier 21K is corresponding to and related to the tuned amplifier of network 10E, except that no power line filter is required at the radio frequency, and an antenna input can be used. Demodulator 5K, pulse amplifier 6K, integrator 7K, and switching network 8K each correspond to and are related to networks 5, 6, 7, and 8 previously described.

As seen in FIG. 12, the RF output stage 7F includes an RF oscillator transistor Q10F having its collector connected to a first terminal of the power supply and its emitter connected through a resistor R31F to the grounded second terminal of the power supply, and to the junction of capacitors C25F and C26F. The oscillator tuned circuit includes an adjustable inductor L4F having one end connected through a capacitor C24F to the base of transistor Q10F and its other end grounded. A pair of series connected capacitors C25F and C26F are connected across inductor L4F and their junction is connected through a resistor R30F to the transistor base and through a capacitor C27F to the arm of output selector switch S2F. The output of the pulser 6F is applied to the base of transistor Q10F. The other components and elements of the network illustrated in FIG. 12 correspond to equivalent components and elements of the earlier described networks and are correspondingly designated with the postscript letters F.

The tuned RF input amplifier 21K, as shown in FIG. 13, includes a transistor Q9K whose base is grounded through a tunable inductor L3K and connected through a capacitor C23K to the arm of input selector switch S3K. The emitter of transistor Q9K is grounded and the collector is connected through a resistor R28K to the transistor base, and through an inductor L4K to the power supply ungrounded terminal. The output of the input amplifier as taken from the collector of transistor Q9K is connected to the demodulator 5K through a capacitor C4K. The other components and elements of the network shown in FIG. 13 are equivalent to the corresponding components and elements of the earlier embodiments and are similarly designated with the postscript letter K.

While there have been described and illustrated preferred embodiments of the present invention, it is apparent that numerous alterations, omissions, and additions may be made without departing from the spirit thereof.

What I claim is:

1. An apparatus for detecting motion in an ambient environment comprising an amplifier tuned to a predetermined frequency and having an input and an output; a first transducer connected to said amplifier input; a second transducer connected to said amplifier output and coupled through said ambient environment to said first transducer to provide positive feedback at said predetermined frequency from said amplifier output to said amplifier input in accordance with the state of said ambient environment whereby to control the signal level of said amplifier; and a first means responsive to a plurality of amplitude variations in said amplifier signal level.

2. The apparatus of claim 1, wherein said transducers are electromechanical and are acoustically coupled through said ambient environment.

3. The apparatus of claim 1, including a tuned filter connected to said amplifier output to attenuate the amplifier signal output at frequencies substantially different from said predetermined frequency.

4. The apparatus of claim 2, wherein said electromechanical transducers comprise piezoelectric elements.

5. The apparatus of claim 1, including a plurality of said first transducers located at spaced positions.

6. The apparatus of claim 1, including a plurality of said second transducers located at spaced positions.

7. The apparatus of claim 1, wherein said signal variation responsive means includes a demodulating network connected to said amplifier and producing a control signal of a character corresponding to said variations of said amplifier signal level and means responsive to said control signal.

8. The apparatus of claim 7, wherein said control signal responsive means comprises a pulse-shaping network having an input connected to the output of said demodulating network, and an output, to a time delay integrating network having an input connected to the output of said pulse-shaping network.

9. The apparatus of claim 1, wherein said amplifier comprises a preamplifier stage having its input connected to said first transducer and a second amplifier stage including a tuned network limiting the pass of said amplifier to a predetermined frequency, said second amplifier stage being connected between said preamplifier stage and said second transducer.

10. The apparatus of claim 9, wherein said first means includes a demodulating network coupled to the output of said preamplifier stage.

11. The apparatus of claim 9, wherein said first means includes a demodulating network coupled to the output of said preamplifier stage; a pulse shaping and limiting network coupled to the output of said demodulating network; an integrating network coupled to the output of said pulse-shaping network; a solid-state switch controlled by the output of said integrating network and a signalling device controlled by said switch.

12. The apparatus of claim 11, wherein said integrating network comprises a resistor connected from the ungrounded side of said pulse-shaping network output, in series with a capacitor to the grounded side of said pulse-shaping network output, and the input of said switching network is connected across said capacitor.

13. The apparatus of claim 2, wherein said first means comprises a third electromechanical transducer mechanically coupled to said second electromechanical transducer through said ambient environment, and means responsive to the variations in the level of the electrical signal output of said third electromechanical transducer.

14. The apparatus of claim 1, wherein said first means is remotely positioned from said amplifier and transducers.

15. The a apparatus of claim 1, wherein said amplifier is tuned to a predetermined frequency, and including an electric power line; first coupling means for connecting an output signal from said amplifier to said power line, said first means being located remotely from said amplifier, and second coupling means for connecting the input of said first means to said power line.

16. The apparatus of claim 15, wherein said first coupling means comprises a filter passing said amplifier frequency and blocking said power line frequency.

17. The apparatus of claim 15, wherein said second coupling means comprises a filter passing said amplifier frequency and blocking said power line frequency.

18. The apparatus of claim 15, including an energizing source for said amplifier comprising a transformer having a primary and a secondary winding, a rectifier connected to said secondary winding and means for connecting said primary winding to said power line.

19. The apparatus of claim 15, including an energizing source for said first means comprising a transformer including a primary and a secondary winding; a rectifier connected to said secondary winding and means for connecting said primary winding to said power line.

20. The apparatus of claim 1 including a plurality of said amplifiers tuned to different frequencies, and each having a transducer connected to the input thereof, and each having a second transducer connected to the output thereof and each pair of transducers coupled through its respective ambient environment, and a plurality of said first means responsive to the variations in the signal levels of said amplifiers only at the tuned frequencies thereof.

21. The apparatus of claim 20, wherein each of said first means includes a filter tuned to the frequency of a respective amplifier.

22. The apparatus of claim 1, including an oscillator, and means for modulating said oscillator in accordance with said amplifier signal level, and means for coupling the output of said oscillator to said first means.

23. The apparatus of claim 22, wherein said oscillator frequency is in the radio frequency range.

24. The apparatus of claim 22, wherein said coupling means comprises an antenna connected to the output of said oscillator.

25. The apparatus of claim 2, wherein said amplifier is tuned to an l ultrasonic frequency.

26. The apparatus of claim 2 wherein said electromechanical transducers are resonant at a predetermined frequency.

27. The apparatus of claim 22 wherein said coupling means comprises an electric power line coupled to the output of said oscillator and to the input of said first means.

28. The apparatus of claim 2, wherein said electromechanical transducers are resonant at an ultrasonic frequency.